June 24, 1958  J. C. FROMMER  2,840,371
AUTOMATIC CORRECTION DEVICE
Filed Jan. 31, 1955                                    3 Sheets-Sheet 1

INVENTOR.
JOSEPH C. FROMMER
BY Kenneth Swartwood
ATTORNEY

INVENTOR.
JOSEPH C. FROMMER
BY Kenneth Swartwood
ATTORNEY

United States Patent Office 2,840,371
Patented June 24, 1958

2,840,371
AUTOMATIC CORRECTION DEVICE

Joseph C. Frommer, Cincinnati, Ohio, assignor, by mesne assignments, to Electric Eye Equipment Company, Danville, Ill., a corporation of Illinois Application January 31, 1955, Serial No. 484,985

16 Claims. (Cl. 271—2.6)

This invention relates generally to automatic correction devices associated with machines, the functioning of which may deviate in opposite directions from a desired condition, the correction devices serving to correct these deviations as a function of signals derived from the deviations themselves. More particularly the invention may be applied to the maintaining of register of printing on multi-color printing presses.

Printing register may be maintained in the direction of travel of the paper web, or in a direction perpendicular to the direction of travel. In this specification, the invention will be described in connection with a multiple-color printing press having an automatic correction device for maintaining register in the direction of web travel. It will be appreciated that the invention may be applied as well in connection with other types of machines, and to embodiments other than specifically described herein.

It has been known to use the signals obtained from the deviation of register of printing on moving webs to correct for the deviation, but prior structures have been disadvantageous for certain reasons. In known correction systems the signal or impulse produced by deviation of register, if of sufficient amplitude, caused a correction of register independent of preceding impulses. High speed machinery such as the multi-color presses here being discussed have vibrations and random errors occurring continuously during the operation of the press. Where the correction for deviation follows the signals produced by deviation, such correction may merely aggravate the error of deviations which follow and have an opposite character. Thus, the independent nature of the correction resulted in difficulty in maintaining accurate register.

In such prior devices an attempt has been made to avoid the disadvantages described by providing a "dead zone"—that is, a range of deviation providing limits within which no correction occurs. This is disadvantageous, also, because if the limits are wider than the amplitude of normal vibrations, correction will only be effected if the general trend of deviation added to the random vibrations exceeds the limits of the "dead zone." If the limits of the "dead zone" are narrower than the amplitude of vibrations, unnecessarily frequent and useless corrections are obtained, causing greater error by succeeding random vibrations of opposite direction, and increasing the use and wear of the correcting mechanism through hunting.

Obviously it is impossible to provide a "dead zone" which is exactly equal to the amplitude of random vibrations, because the patterns of vibration vary from printing press to printing press, and on the same equipment, they vary for different press speeds, rolls of paper, etc. The vibrations of the printing elements are also aggravated by vibration of the structure supporting the sensing elements of the correcting device, causing additional random error of indication.

The principal object of the invention is to provide a correcting mechanism which will eliminate the disadvantages of prior devices described by providing structure which accumulates error signals. When sufficient signals of a given polarity are accumulated, a correction is made in the proper direction, and thereafter the apparatus restored at least partially to a neutral condition preparatory to receiving new signals to be accumulated. Signals of opposite polarity, or representing deviations in opposite directions, cancel one another, such that the eventual result is an average, representative of a trend of error. As a result the machine will provide register with as accurate results as permitted by the vibrations of the printing elements, and this is done with a minimum of corrective activity. True deviations less than vibration errors can be corrected.

Another object of the invention is to provide a structure for automatically correcting deviations of two operations performed on a machine in registration, which includes means for accumulating impulses resulting from misregister, each impulse resulting in a change of state of the accumulating means, both as to direction or polarity and amount. When the accumulated pulses, irrespective of number and direction, cause the state of the accumulating means to reach a condition representing a value of total signal in one direction, correction means are caused to operate to correct the deviation in one direction. If the accumulating means assumes a state representing an excess of deviation signals of a certain amount in the opposite direction, an opposite correction will be made. Following the correction, the accumulating means is automatically reset to neutral value and is in condition to receive deviation signals once more.

Still a further object of the invention is to provide a structure as described above in which the accumulating means comprises a capacitor, and the deviation errors each apply a charge to the capacitor—a positive charge for deviation from registration in one direction, and a negative charge for deviation in the opposite direction. In the preferred embodiment, the deviation signal applies an impulse to the accumulating means which changes its state not only in a given direction, but also in an amount proportional to the amount of deviation. The charge applied to the capacitor is proportional to the amount of deviation from exact registration.

When the charge upon the capacitor reaches a certain value—either negative or positive—the capacitor is discharged through a circuit which energizes correction means to bring the two operations being performed on the web back into regisration. This is done preferably in small increments, by successive accumulations and resulting discharges. The negative charge operates the correction means in one direction, and the positive charge operates the correction means in the other direction.

If the signals caused by deviations from accurate registration have sufficient amplitude, one such signal may result in energization of the correction means. This may occur at the passage of splices, and the like. The correction over certain limits may be proportional to the errors by the use of known meaans operating beyond pre-set limits.

Other objects of the invention will become apparent as the description of a preferred embodiment is set forth hereinafter in connection with the drawings illustrating the same in which.

In order to explain the invention clearly, it is believed advisable first to point out the nature of the apparatus with which the invention is associated. In this description, the invention is applied to a printing press which is intended to print several colors in registration, and the purpose of the equipment is to maintain registration between two of these colors. Obviously several systems will be needed for the different pairs of colors, but it will suffice to describe the apparatus only in connection with two printing cylinders, each applying only one color.

Figure 1:
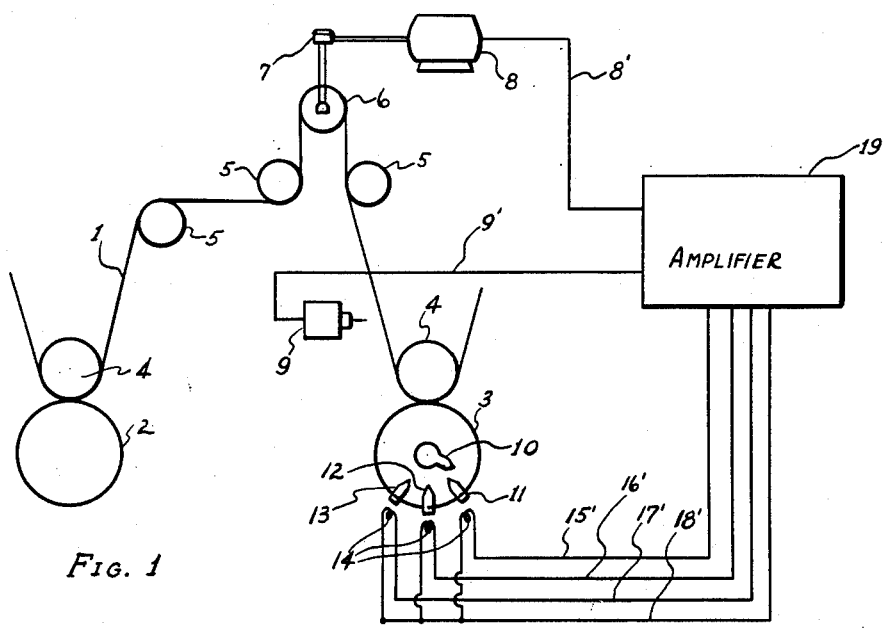
Fig. 1 is an overall schematic diagram of a printing press having the essential parts of the correcting system of the invention associated therewith.
Figure 2:
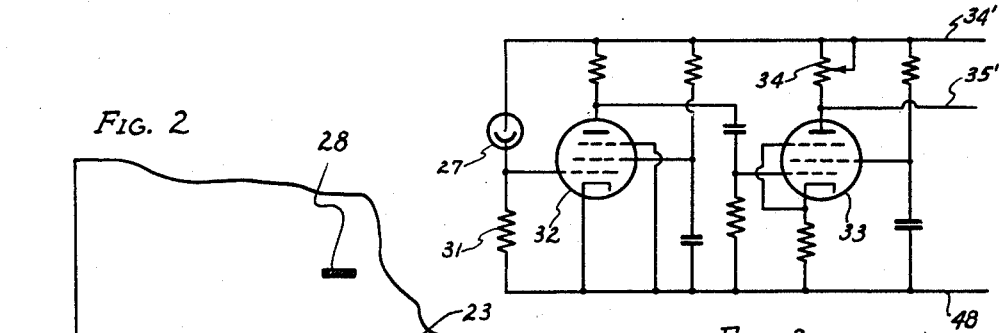
Fig. 2 is a schematic diagram of the essential parts of the photoelectric sensing portions of the device which is referred to in the art as a "scanner;"
Figure 3:
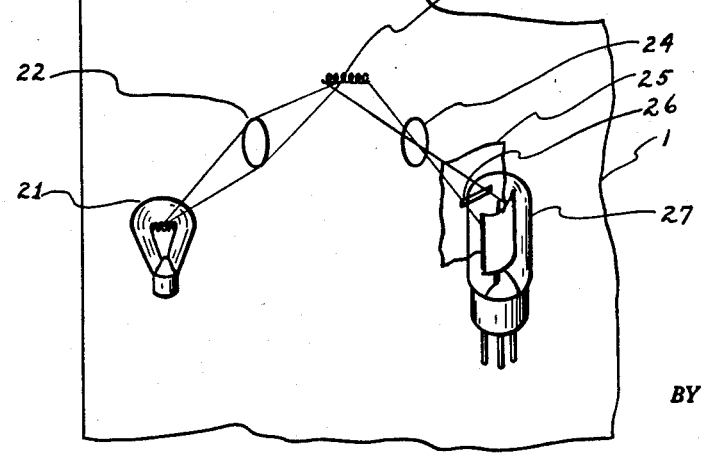
Fig. 3 is an electrical circuit diagram of the scanner of Fig. 2.

Thus, Figs. 1, 2 and 3 represent, not only the portions of a press that are well-known and in common use, but also illustrate portions of equipment used in known correction devices, such as for example, the structure described and claimed in U. S. Patent 2,518,325, owned by the assignee of this application.

The reference character 1 represents a continuous web of paper moving through a printing press, which includes a first printing cylinder 2 applying a yellow impression, for example, and a second printing cylinder 3 applying a red impression. The web is pressed against the printing cylinders 2 and 3 by conventional back-up rollers 4, and guided through the press by guide rollers, several of which are indicated at 5. Dryers between impressions and many other details are not shown in the diagram, for simplicity.

In order to compensate for registration, a roller 6 which is bodily movable vertically is supported for incremental movement by a guide mechanism 7 driven by a motor 8 which is energized by some suitable source of power not illustrated and controlled as to amount and direction by a connection with the amplifier 19. This connection is shown as a single cable 8' which may represent several conductors. Raising the roller 6 will increase the printing distance between printing cylinders 2 and 3, while lowering it will decrease this distance.

The printing cylinder 2 applies a small registration mark 28 (see Fig. 2) to the web and this mark is viewed by the scanner 9 and a resulting signal transmitted to the amplifier 19 by way of the cable 9'. At the same time, a magnetic pointer or flipper 10 which rotates with the shaft of the cylinder 3 passes three stationary pole pieces 11, 12 and 13, and produces several signals in the respective coils 14 inductively coupled to the pole pieces, which signals in turn are transmitted to the amplifier 19 by way of a cable having common conductor 18' and other conductors 15', 16' and 17'.

As described in said U. S. patent above referred to, the last described structure which is associated with the cylinder 3 is a magnetic indicator capable of being used in a correction system. The signal which is received when the flipper 10 passes the pole piece 12 is synchronized with the signal received from the scanner 9 when the mark 28 is detected by the scanner. As shown in Fig. 2, the mark 28 is applied to the web 1 and passing down the web intersects the light spot 23 which is projected upon the web from the lamp 21 through the lens 22. The spot 23 is reflected through the lens 24 and focussed on the perforation 26 formed in the shield 25 surrounding the phototube 27, in the plane of this perforation. When the mark 28 enters the area of the spot 23, it decreases the light received by the phototube 27, thereby decreasing its signal output, resulting in a negative going pulse (see wave shape A in Fig. 5).

The reference character 9 also represents a pre-amplifier which is located in the same housing with the optical means for convenience and other advantages. The phototube 27 is here represented by a conventional symbol, and is connected to ground 48 through a resistor 31 so that the flow of current from the phototube produces a signal across resistor 31 which is applied to the grid of the pentode 32, amplified and inverted and applied to the grid of the pentode 33 through a coupling capacitor so that only the change in current from the signal will appear across the output of the pentode 33. The output of the preamplifier appears between the lead 35' and ground and consists of a signal which is substantially identical to signal produced by the phototube when a mark 28 passes the image 23, and the amplitude of this signal is varied by the variable resistor 34.

Figure 5:
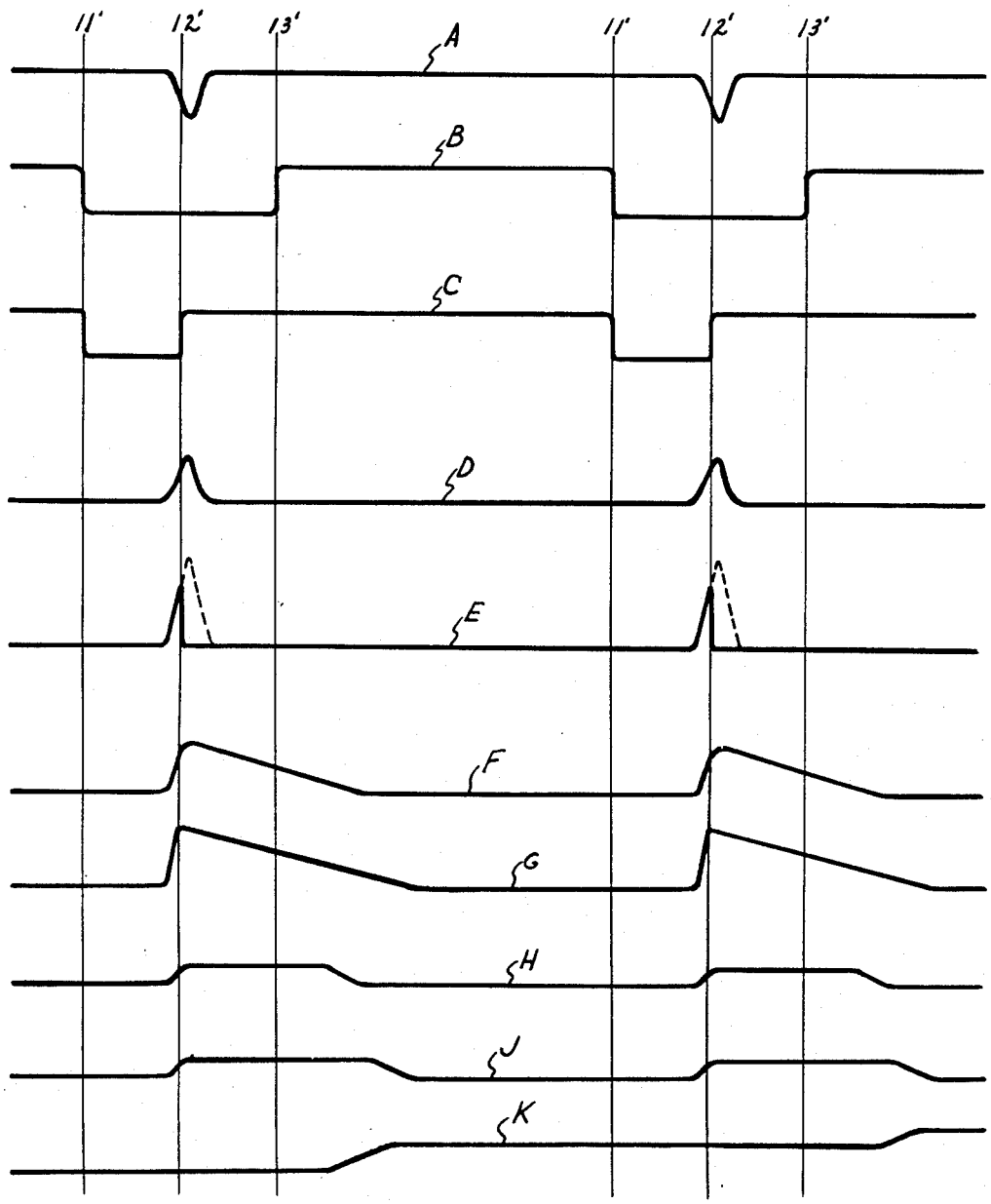
Fig. 5 is a chart illustrating the wave forms of the voltages in various parts of the circuit of Fig. 4, all on a common time axis.

The invention will be explained in considerable detail hereinafter, but the basic principles of operation are best undertood by first examining the voltage curves of Fig. 5. As explained, the curve A represents the signal from the scanner which occurs when a mark 28 is intercepted by the image 23. The signal of A appears on the lead 35' and is applied to the grid of the first tube 37 of the amplifier 19.

The time abscissas 11', 12' and 13' are fixed and represent the instants that the flipper 10 passes the pole pieces 11, 12 and 13 respectively. The signals produced by passage of the flipper 10 are applied through leads 15', 16' and 17' (lead 18' being the common return) to flip-flop circuits, described in said U. S. Patent 2,518,325 and give square gating wave forms on the plates 95 and 96 of the left hand triode sections of the dual tubes 93 and 94 respectively. The wave form B appears on the plate 95, and the wave form C appears on the plate 96. The large negative square wave B is applied to the grid of the right hand triode of the dual tube 40 and the half negative square wave C is applied to the grid of the left hand triode of the dual tube 40.

The result of these waves is that the right and left hand tubes of the dual tube 40 pass saturation currents at all times except when the grid of the respective side is in cut-off. In other words, the potential of the left plate of dual tube 40, connected to the lead 38 cannot vary from a very low potential at all times, except between the abscissa 11' and 12' when the negative excursion of the wave C occurs; and the potential of the right hand plate of the dual tube 40, connected to the lead 39 cannot vary from a very low potential at all times, except between the abscissa 11' and 13' when the negative excursion of the wave B occurs. The leads 38 and 39 comprise the output conductors of the dual triode 37, and it will be obvious that the signals which occur on these leads will be strictly gated by the signals from the dual tube 91, tube 92, and dual tubes 93 and 94 controlled by the flipper 10 moving past the pole pieces 11, 12 and 13.

The signal from the pre-amplifier is applied to the grid of the left hand triode of the dual tube 37 and a portion at tap 36' of the voltage divider 36 is applied to the grid of the right hand triode of dual tube 37. The portion is preferably chosen to be one-half of the full signal, and both the half and full signals are amplified in the dual tube 37 and appear at the leads 38 and 39 respectively. The half signal is shown as the voltage curve D in Fig. 5 and it appears on the lead 39, while the whole signal is shown at the voltage curve E and it appears on the lead 38. In view of the gating action of the square wave C, the signal E is suppressed for a portion of its time, the dotted portion in Fig. 5 being eliminated.

From this, it will be seen that the amplitude of the signal on the lead 39 remains constant, while the signal on the lead 38 increases or decreases in amplitude, depending upon the condition of registration. In the case that the registration is perfect, exactly half of the signal on the lead 38 will be cut off and its amplitude will be substantially equal to the amplitude of the signal D on the lead 39. Since, as will be seen later herein, a comparison is made between these two signals, if they are equal nothing occurs to affect the correction means. Otherwise, the amplitude of signal E will be less if the yellow impression leads the red, and will be greater if the yellow impression lags the red.

The signals D and E are applied to the opposite grids 41 and 42 of the cathode follower sections of the dual tube 43 whose cathodes 51 and 52 are connected respectively to the grids 59 and 60 respectively of the triode tubes comprising the dual tube 61. The signals appearing at the cathodes 51 and 52 are represented respectively by the voltage wave forms G and F. The right hand portions of these wave forms are gradual decreases because the cathode follower circuits of the tube 43 are formed of elements which are chosen to give slow decay time to the signals appearing at the grids. In other words, the cathodes readily follow the positive-going excursions of the signals applied at their grids, but do not follow the negative-going portions.

The signals of the two cathodes 51 and 52 are applied to the dual tube 61 at the grids 59 and 60 respectively. The grid signals are H for grid 59, and J for the grid 60.

The dual tube 61 serves to charge the condenser 62, which is the accumulating element previously referred to, either positively or negatively, depending upon the amount of current which flows in the respective tubes of the dual tube 61. The amount of current flow, on the other hand, both as to amount and polarity depends upon the difference between the time duration of the two signals F and G, which of course depends upon the amount by which the impressions are out of register. Since the time duration of the signal F is constant, the only one which will vary will be the duration of the signal G. The grids 59 and 60 are maintained in cut-off condition and the sections pass current only when the voltage applied by the cathodes 51 and 52 exceed their stationary value, assuming a low voltage, limited by grid current. Thus, the charging current for the condenser 62 both as to amount and polarity depends upon which of the signals F and G is the longest. The difference produces the charging current, which accumulates as shown in curve K, representing the voltage at point 63, continuously rising or dropping with each signal, because of no leak-off. Considering the dual tube 61, its output is a signal which is applied to the condenser 62, to be accumulated. This signal has a value which is proportional to the amount of deviation and a polarity or direction which depends on the direction of deviation. Other kinds of signals could be applied to the grids 59 and 60 so long as they are variably related to one another in accordance with the amount and direction of deviation.

When the voltage of the condenser 62 is high enough, it causes the proper relay to be energized to correct for the accumulated deviation represented by the signals required to produce the charge—either positive or negative. As will be more apparent from the explanation of the details of the circuit, the signal from the accumulating condenser is applied by way of the delay line 66 and 67 to the grid 68 of dual tube 69 which is connected so that the plates 70 and 75 have opposite potentials appearing thereon. Thus, when the condenser charge from condenser 62 exceeds a certain positive value, the relay 84 will be energized to drive the motor 8 in one direction, and when the charge is more negative than a certain other value, the relay 83 will be energized. Other refinements will be mentioned hereinafter, but for the time being this completes the explanation of operation in connection with the voltage wave forms of Fig. 5.

Figure 4:
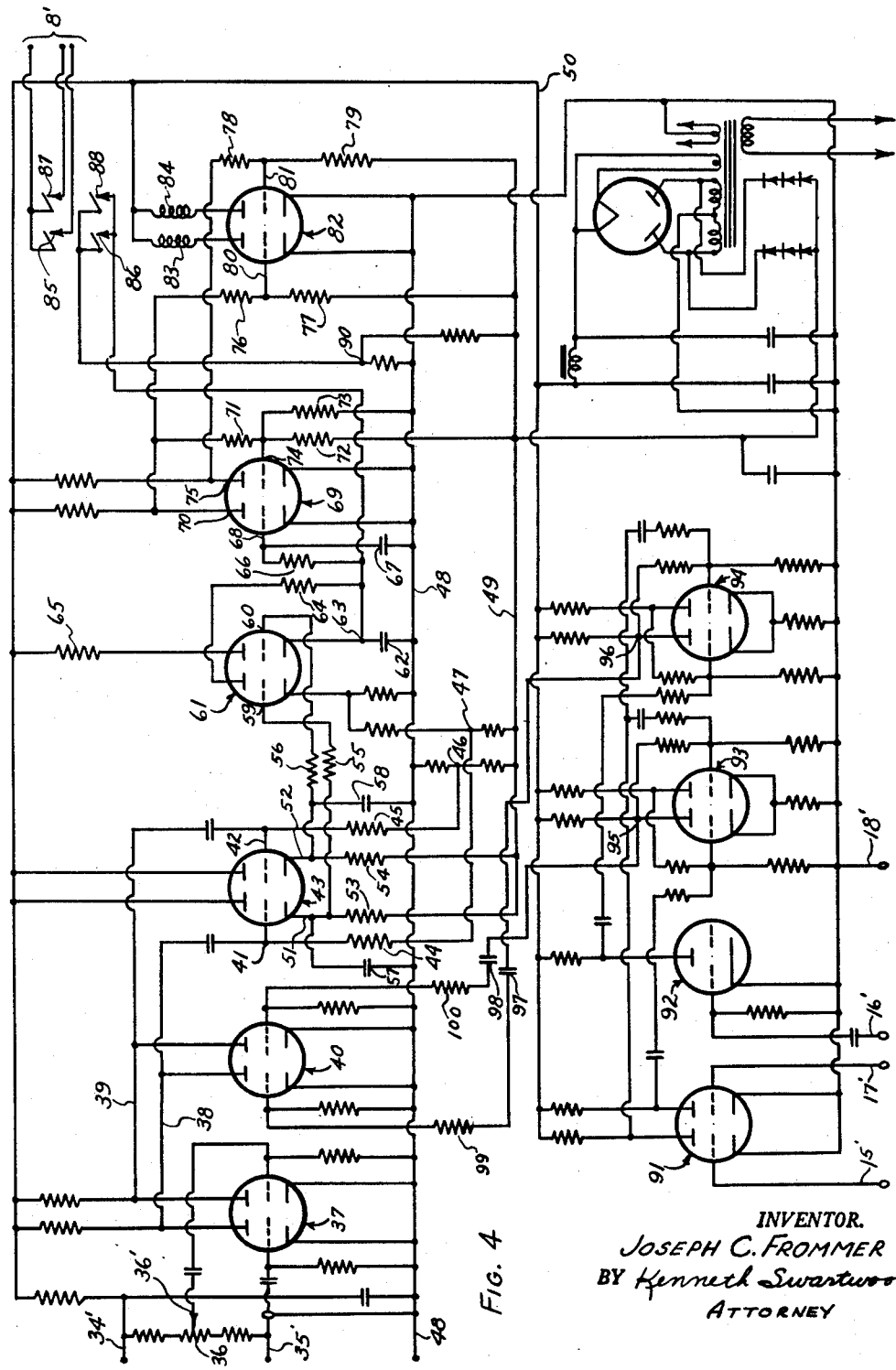
Fig. 4 is an electrical circuit diagram of amplifier and associated circuitry of the preferred embodiment of the invention.

In order to achieve the results which have been described, the amplifier 19 is constituted of the elements shown in more or less conventional manner in Fig. 4. The leads from the preamplifier are 34', 35' and 48. These are cabled together as cable 9' and comprise respectively, the plate potential line, the output conductor, and the ground. The dual tube 37 is a pair of straight capacitive coupled amplifiers, the outputs of which are applied to the respective sections of the dual tube 43 through condenser coupling elements.

Although the gating circuit is fairly well explained in the above referred to patent, some explanation at this point may be enlightening. The common return 18' is connected to the ground lead 48. The first reached pole piece 11 produces the first signal pulse which is applied by way of lead 15' to the left hand triode section of dual tube 91, the output of which is applied to the right hand grids of both of the dual tubes 93 and 94. The second reached pole piece 12 produces a signal pulse which is applied by capacitive coupling to a triode 92, the output of which is capacitively coupled to the left hand grid of the dual tube 94. The last reached pole piece 13 produces a signal pulse which is applied directly to the right hand triode section of the dual tube 91 the output of which is capacitively coupled to the left hand section of the dual tube 93.

The dual tubes 93 and 94 are connected as so-called flip-flop circuits to produce the square waves B and C referred to. Both left hand plates 95 and 96 will become negative when the flipper reaches the pole piece 11 being the output of the left hand sections of the tubes to which the first signal is applied. The square wave C is completed when the flipper 10 reaches the pole piece 12 because the signal from triode 92 is applied to the left hand section of dual tube 94 and causes the plate 95 to go positive. Some time later this same thing happens to the plate 95 as the flipper 10 reaches the pole piece 13 and the square wave B is completed.

These square waves are applied through capacitors 97, 98 and resistors 99 and 100 to the respective grids of dual tube 40 to keep these grids in cut-off during the time that the plates 95 and 96 are held negative, permitting signals to be applied through the conductors 38 and 39 to the grids 41 and 42 only during the respective gating periods as previously explained. The gating signal C will cut the signal on the lead 38 along the abscissa 12' and by proper adjustment of the values of the signals, through the potentiometers 36 and 34, the signals appearing at the grids 41 and 42 can be chosen to be of equal amplitude when a condition of perfect registration exists. The constants in the circuit between dual tube 43 and the condenser 62 should also be adjusted that under these circumstances the flow of current in the respective tubes or sections of the dual triode 61 is equal and no charge is applied to the condenser 62. Mis-register in one direction or the other causes the signal on lead 38 to be either of higher or lesser amplitude than the signal on the lead 39 thereby causing the condenser 62 to be charged either positively or negatively because of the excess flow of current in one section or the other of the tube 6.

The dual cathode follower tube 43 has its grids 41 and 42 connected respectively through resistors 44 and 45 to the taps 46 and 47 respectively of voltage dividers connected between ground 48 and a very low potential source 49, having a voltage of say minus 300 volts D. C. The plates of the dual tube 43 are connected to the plate potential line 50 which may have a voltage of positive 300 volts D. C. so that in effect the total voltage on the tube 43 is approximately 600 volts. Cathodes 51 and 52 of the dual tube 43 are connected through resistors 53 and 54 respectively to the negative line 49 and through the resistors 55 and 56 respectively to the grids 59 and 60 of the twin triode 61. Cathodes 51 and 52 are connected also to ground through capacitors 57 and 85 respectively.

The capacitors 57 and 58 are chosen of such values that the cathode currents of the tube 43 can charge them fast enough without the appearance of grid current if the voltages on the grids 41 and 42 increase, i. e., are positive-going. The resistance values of 53, 54, 55, and 56, however, are so chosen that if the voltages on the grids 41 and 42 decrease, i. e., are negative-going, the cathodes will drop to a lower voltage only with considerable delay. This will produce the voltage wave forms F and G of Fig. 5. The time constant of this delay is preferably chosen chosen to be of the order of the time duration between two consecutive appearances of the marks 28 (see Fig. 2) at the scanner 9 for the highest practical speed of the web 1.

Thus, each time a positive signal appears on the grids 41 and 42, the cathodes 51 and 52 will maintain as positive a voltage level on the grids 59 and 60 of dual tube 61 as the grid current through the resistors 55 and 56 will allow. This will occur for a time duration that will depend upon the amplitude of the signals D and E appearing at the grids of the tube 43. In other words, the signals H and J are controlled by the grid current drawn from the grids of the respective tubes of the dual tube 61.

As will be seen, the left hand plate of the dual tube 61 is connected to the cathode 63 of the right hand section, which is connected to ground through the large capacitor 62 of a value—say two micro-farads. The flow of current in left hand section of the tube thus makes the point 63 more negative since the two sections are connected in series insofar as D. C. is concerned, while the flow of current in the right half makes the point 63 more positive. The currents are limited by the resistors 64 and 65. The voltage of the point 63 accumulates because of an absence of any leak-off. Obviously it will maintain only the balance of charge between the positive and negative pulses applied, building up a charge of only one value, of course, representing a total deviation in one direction as a result of, say, a large number of small signals of both kinds.

The point 63 of capacitor 62 is connected to the grid 68 of the dual tube 69 through a resistor 66, the grid 68 being connected to ground through the capacitor 67. The signal which appears on the plate 70 of the left hand section of the dual tube 69 is applied through a voltage divider 71, 72, and 73 to the grid 74 of the right hand section of the dual tube 69 so that the plates 70 and 75 have opposite polarity signals appearing thereon. The plates 70 and 75 are connected respectively to the grids 80 and 81 of the dual tube 82. The outputs of the respective sections of the dual tube 72 include the relay coils 83 and 84 in the respective plate circuits, the relay coil 83 when carrying sufficient current causing the closing of the contacts 85 and 86, while the relay coil 84 causes the contacts 87 and 88 to close when it carries sufficient current. Voltage dividers 76, 77 and 78, 79 enable the proper value of signals to be applied to the respective grids.

It will be noted that the contacts 86 and 88 both serve when closed to connect the point 63 of the condenser 62 to a point 90 which is maintained at a voltage halfway between the positive and negative limits to which the condenser is intended to be charged. This is attained by means of suitable resistors connected from the point 90 to the negative potential line 49 and the ground line 48. Any other arrangement to achieve the desired mid-point may be used. For perfect registration, this voltage of the point 90 will be substantially the same voltage that exists at the point 63, presuming no accumulation of previous signals.

If the point 63 becomes so positive that a certain high value is reached and exceeded, the voltage applied by the plate 75 to the grid 81 will be sufficient to cause flow of current in the plate circuit including the series coil 84 and the relay contacts 87 and 88 will close. The contacts 87 close a circuit through leads controlling the motor 8, being conductors in the cable 8'. The contacts 88 restore the capacitor 62 to the neutral value of point 90.

If the point 63 becomes so negative that a certain low value is reached and exceeded, the plate 70 will apply a signal to the grid 80 such as to cause sufficient flow of current in the plate circuit including the series coil 83 which will close the relay contacts 85 and 86. The contacts 85 serve to cause the motor 8 to be driven in a direction opposite to that which it is driven when the contacts 87 are closed. The contacts 86 perform the identical function as the contacts 88.

In restoring the charge on the condenser 62, the time which is required for the condenser to reach the neutral value will depend upon the values of the elements of the charging circuit, including the resistor 66 and the capacitor 67. The voltage of the point 63 will approach the neutral value and release the relay after which it will require additional charge to cause the energization of one or the other of the relay windings 83 or 84.

In the event there is a relatively large deviation, one signal may be sufficient to cause the energization of one of the relay windings 83 or 84 by itself. The signal applied to the grid 68 may be considerably greater than the amplitude just needed to energize one of the relay windings. The result is that the time for restoring the capacitor 62 to the neutral value will be longer, and hence a greater correction will be applied. The practical effect of this is that while the invention will accumulate and average small signals to reach an accumulation sufficient to produce a small correction corresponding to the amount of the accumulation, nevertheless, when a large deviation occurs, the correction will be proportional to the amount of the deviation.

It is feasible to combine only the cumulating portion of the invention with a known structure that gives correction proportional to deviation for large signals. The low limit of operation of the proportional correction system must be carefully chosen for achieving the maximum benefit of the cumulative deviation signal portion of the invention.

Proper choice of the constants of the circuits of dual tube 82, the characteristics of the relays having the coils 83 and 84, and the mechanical specifications of the motor 8 and the guide mechanism 7 will control the amount of correction applied by a single discharge of condenser 62 under normal conditions. The amount of correction is preferably an increment of that which would be required to completely restore registration. Thus, it requires several accumulations to bring the press into perfect registration, which is practically found to give best results with least activity.

It is believed that many modifications can be made to the invention without in any way departing from within the limitations embodied in the claims.

I claim:

1. An electronic device for making corrections in the functioning of a machine comprising a capacitor; a first vacuum tube system having at least a cathode, a grid and an anode; a second vacuum tube system having at least a cathode, a grid, and an anode; at least one relay having a coil and switching contacts; signalling elements and actuating elements; means biasing both of said systems to render the same normally non-conducting; means operable as a function of said signalling elements to render said systems conductive; said capacitor being connected to said cathode of said first vacuum tube system and to the anode of said second vacuum tube system to acquire a potential from the output of both systems; said first vacuum tube system being actuated by signals of said signalling elements indicating misfunctioning in one direction, said second vacuum tube system being actuated by signals of said signalling elements indicating misfunctioning in the opposite direction; said capacitor being connected to said actuating elements so as to cause action in one direction if its voltage reaches a certain upper point and action in the opposite direction if its voltage reaches a certain lower point; said coil being connected to said actuating elements and at least one of its said contacts being connected in a circuit between the electrodes of said capacitor so as to reset its voltage to a value between said upper point and said lower point when said actuating elements are actuated.

2. In a device for automatically correcting deviations in the functioning of a machine, said device comprising deviation detecting means which provide signal voltages varying in magnitude and polarity with the deviation relative to a norm, and correcting means capable of restoring the proper functioning of the machine, the improvement which comprises means responsive to said signal voltages arithmetically to accumulate the same to one or the other of two predetermined potential levels of opposite polarity representative of true accumulated deviation, means operative only when one or the other of said levels has been reached independent of the number of signal voltages to actuate said correction means to apply an increment of proper correction to the functioning of said machine, and means for restoring the accumulating means to a neutral level simultaneously with the actuation of said correction means.

3. In a device for automatically correcting deviations in the functioning of a machine, which deviations may occur in different directions, said device comprising signalling means which provide a first type of signal upon the occurrence of deviations in one direction and a second type of signal upon the occurrence of deviations in the other direction and correcting means for making corresponding corrective adjustments in the functioning of the machine, the improvement which comprises signal accumulating means connected to said signalling means in such a manner as to receive therefrom and store the signals by arithmetically offsetting one type against the other, means responsive to a predetermined change in the state of said accumulating means as a result of the difference in cumulative magnitude between signals of the first and second types supplied thereto independent of the number of signals, for causing operation of said correcting means in the proper direction to restore functioning of the machine in its desired state, and means for restoring the accumulating means to neutral state with respect to the difference in accumulated signals after an operation of said correcting means.

4. A structure as claimed in claim 3 in which the accumulating means is an electric charge retaining device and the signals comprise respectively positive and negative charges applied to the charge retaining device to build up the total charge thereof, the change comprising the reaching of a predetermined level of charge of one or the other polarity.

5. A device for automatically correcting the deviation of the functioning of a machine from a normal condition comprising signal producing means periodically providing signals related in polarity with the direction of the deviation and in magnitude with the extent of deviation, correcting means for incrementally correcting the functioning of the machine toward normal condition, signal accumulating means connected to receive signals from said signal producing means and arithmetically combine the same whereby to eventually achieve a state corresponding to a predetermined level of accumulation of signals of one polarity above a neutral condition, said state corresponding to a true accumulation of deviations predominating in one direction, said signal accumulating means being connected to said correcting means and actuating the same when said state has been achieved, and means for returning said signal accumulating means to said neutral condition upon actuation of said correcting means.

6. The device as claimed in claim 5 in which the time within which said state is reached is independent of periodicity of signals and is dependent only upon the arithmetic sum of a plurality of such signals reaching or exceeding a predetermined value.

7. A device as claimed in claim 5 in which said accumulating means is of such size that a plurality of small deviations in any one direction is required to cause the said state to be reached, and the increment of correction is less than required to give full correction of the deviation to normal condition.

8. A device as claimed in claim 7 in which time delay means are provided to delay the return to neutral condition in the event a single signal representing deviation in one direction is produced, the magnitude of which is greater than required to cause said accumulating means to reach said state whereby the correcting means will be actuated for a period of time to provide a correction greater than said increment by an amount dependent upon the excessive magnitude of said single signal.

9. In a device for automatically restoring the functioning of a machine having a tendency to deviate in one or the other of opposite directions from a normal condition, and in which means are provided for producing a signal periodically whose amplitude is a measure of the amount of deviation and whose polarity is dependent upon the direction of deviation, and the machine is provided with correction means having an actuating circuit adapted to be energized to operate the correction means in restoring the normal condition of functioning of the machine; means for causing only true deviations devoid of self-cancelling deviations to cause energization of the actuation circuit which consists of a signal accumulator connected to receive the periodic signals and add the same arithmetically over a plurality of periods and accumulate the same until a level of one polarity is reached corresponding to a predetermined triggering potential above a neutral value, the accumulator being connected to the actuating circuit and the actuating circuit being normally inoperative but being rendered operative only when triggered by said triggering potential to energize the actuating circuit one way or the other in accordance with the polarity of the triggering potential, and means restoring the potential of the accumulator to neutral value.

10. A structure as claimed in claim 9 in which the restoring means is connected to operate simultaneous with and only in the event of operation of the actuating circuit.

11. A structure as claimed in claim 10 in which the accumulator is a capacitor and the signals are either positive or negative applying a charge of one or the other polarity to the capacitor, and the level of added charge of the capacitor provides said triggering potential.

12. An electronic device for making corrections in the functioning of a machine which has a tendency to deviate from a normal condition and which produces signals indicative of the extent and direction of deviation and which has a correction mechanism for restoring normal condition, said electronic device comprising a capacitor, means converting the signals into two different types variably related to one another as a function of deviation, a pair of vacuum tubes each having at least a grid, a plate and a cathode and the tubes being series connected with the plate of one and cathode of the other connected together signal-wise and a source of direct current connected across the series-connected tubes, means rendering the tubes both non-conductive, the converting means being connected to place the respective types of signals on the respective grids of the series-connected tubes, the capacitor being connected to the junction between tubes, the signals when applied to the grids of the tubes serving to render the tubes conductive whereby the capacitor will be charged positively or negatively in accordance with the particular signal, the capacitor being normally at a neutral potential level and serving to accumulate the more predominant charge, means responsive to a predetermined high level of charge operating said correction mechanism, and means simultaneously operable to restore said capacitor to said neutral level whereby the correction mechanism will produce an incremental correction.

13. A device as claimed in claim 12 in which said responsive means comprise vacuum tube circuit means having relay means in the output thereof and having the capacitor connected also to the input thereof whereby the high level of charge will provide an output signal driving said relay means, and the relay means having first contacts for energizing the correction means and second contacts restoring said neutral level, and there being a source of potential connected with the second contacts maintained at said neutral level.

14. A device as claimed in claim 13 in which delay means are provided to delay the restoration of the capacitor potential to neutral level whereby to lengthen the time at which said correction mechanism is operative in the case of large deviation signals.

15. An automatic registration correction device for use with a machine having a continuous member passing through the said machine and having operations performed on said continuous member at stations spaced apart and the operations required to be performed in registration, the machine being subject to random and vibration-caused deviations tending to cancel themselves, there being a reference mark applied each cycle of operations at one station and means for converting said reference mark into a deviation signal at a subsequent station, converting means being related to the operation performed at the subesquent station such that upon registration there will be no deviation signal, but upon deviation there will be a signal the amplitude of which is related to the amount of deviation, and the polarity of which is related to the direction of deviation from registration, correction means capable of being operated to adjust the relative positions of the continuous member and stations so as to restore registration, electronic means for accumulating signals produced by said converting means arithmetically over a number of cycles of operations whereby to cancel the random and vibration-caused deviations and leave a balance summation of true deviation signals, a triggering circuit for actuating the correction means and connected with the accumulating means and adapted to be energized by the accumulating means but only in the event the balance summation of true deviation signals of one polarity or another reaches or exceeds a predetermined level relative a normal neutral level, whereby said correction means will operate when said level is reached to apply a correction, and means operable to restore said accumulating means to a neutral condition.

16. An electronic device for making corrections in the functioning of a machine performing an operation on a moving member in registration with a previous operation performed on said member, the second performed operation having a tendency to be out of register with the first performed operation in one or the other of opposite directions, comprising, means producing a first signal of predetermined time duration in synchronism with one of said operations, means comparing the registration of said one operation with the other operation and producing a second signal in synchronism with said first signal but having a time duration greater or lesser than said first signal depending upon direction of deviation, the difference between time durations of said first and second signals being proportional to the amount of deviation, deviation correcting means, means converting said first and second signals into currents of opposite polarity, means arithmetically adding the currents and accumulating the difference as a potential charge proportional to said difference and of a polarity depending upon the direction of deviation and means energized by said charge to actuate said deviation correcting means, but only upon the accumulating means reaching a predetermined charge level of one polarity or the other.

References Cited in the file of this patent

UNITED STATES PATENTS

| | | |
|---|---|---|
| 2,203,706 | Stockbarger | June 11, 1940 |
| 2,518,324 | Hurley | Aug. 8, 1950 |
| 2,583,580 | Ludwig | Jan. 29, 1952 |
| 2,692,962 | Thomson | Oct. 26, 1954 |
| 2,694,162 | English | Nov. 9, 1954 |
| 2,695,171 | Coffman | Nov. 23, 1954 |

FOREIGN PATENTS

| | | |
|---|---|---|
| 481,129 | Canada | Feb. 12, 1952 |
| 708,162 | Great Britain | Apr. 28, 1954 |

UNITED STATES PATENT OFFICE
CERTIFICATE OF CORRECTION

Patent No. 2,840,371                                       June 24, 1958

Joseph C. Frommer

It is hereby certified that error appears in the printed specification of the above numbered patent requiring correction and that the said Letters Patent should read as corrected below.

Column 8, line 45, beginning with "1. An electronic device" strike out all to and including "elements are actuated." in line 71, same column, comprising claim 1; for the claims now appearing in the patent as numbers "2", "3", "4", "5", "6", "7", "8", "9", "10", "11", "12", "13" "14", "15", and "16" read — 1, 2, 3, 4, 5, 6, 7, 8, 9, 10, 11, 12, 13, 14, and 15, respectively; and in the heading to the printed specification, line 11, for "16 Claims" read — 15 Claims —.

Signed and sealed this 23rd day of September 1958.

(SEAL)
Attest:

KARL H. AXLINE

Attesting Officer

ROBERT C. WATSON
Commissioner of Patent